Jan. 1, 1935.  J. BATTALINE  1,986,494
CHUCK FOR LATHES OR THE LIKE
Filed Jan. 19, 1931  2 Sheets-Sheet 1
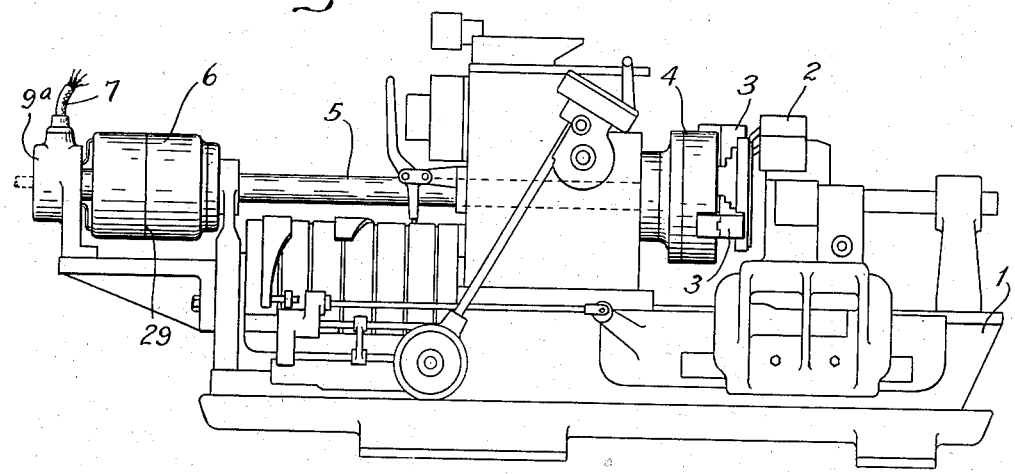
Fig.1.
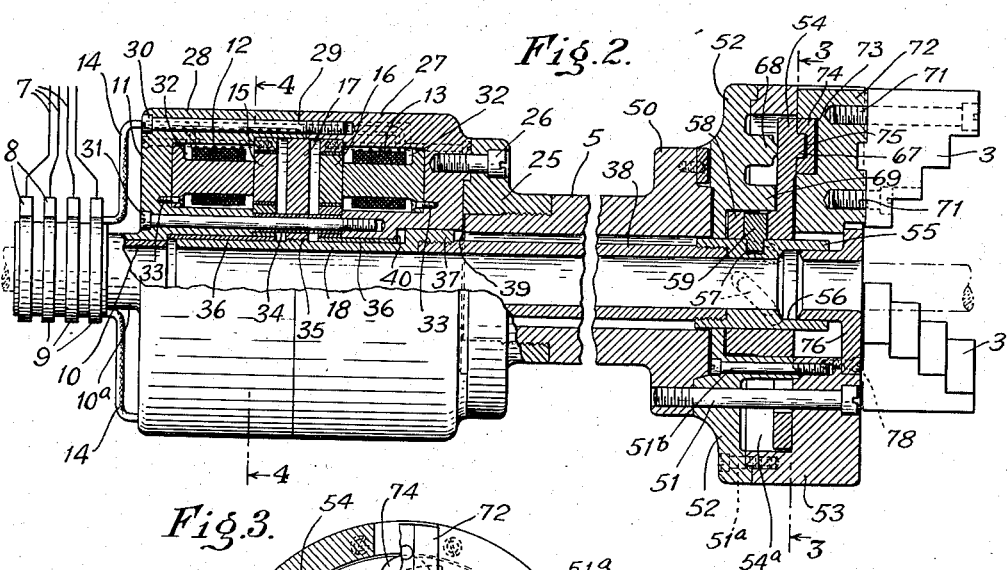
Fig.2.
Fig.3.
INVENTOR
JOHN BATTALINE
BY
ATTORNEY Jan. 1, 1935.                J. BATTALINE                1,986,494
                     CHUCK FOR LATHES OR THE LIKE
                      Filed Jan. 19, 1931        2 Sheets-Sheet 2
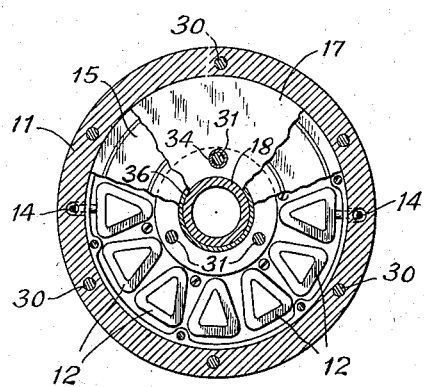
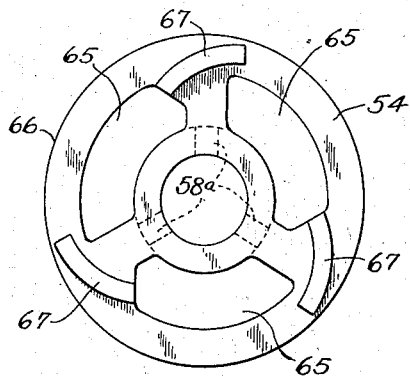
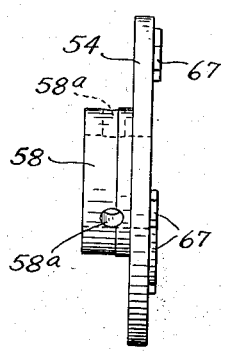
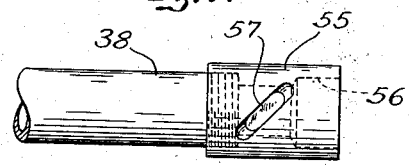
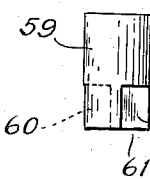
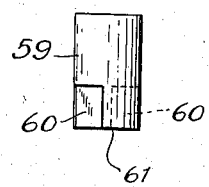
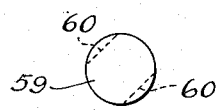
INVENTOR
JOHN BATTALINE
BY
ATTORNEY Patented Jan. 1, 1935

1,986,494

UNITED STATES PATENT OFFICE 1,986,494

CHUCK FOR LATHES OR THE LIKE

John Battaline, Hartford, Conn.

Application January 19, 1931, Serial No. 509,717

36 Claims. (Cl. 279—1)

My invention relates to chucks for lathes or the like.

It has among its objects to provide an improved chuck, and more particularly an improved chuck especially adapted to use with bar stock. A further object of my invention is to provide an improved chuck of the electrically operated type, and an improved chuck of this type which is also adapted to use with bar stock. A still further object of my invention is to provide improved jaw actuating means operative to move the chuck jaws into and out of gripping position upon a rotary movement of the jaw actuating means, improved co-operating actuating means longitudinally reciprocable and having improved connections with the connections heretofore mentioned for effecting rotation of the same, and improved power connections for reciprocating said reciprocable means, all whereby an improved and simplified construction is produced, and one particularly adapted to use in connection with bar stock and with electrically operated power means. These and other objects and advantages of my improved construction will, however, hereinafter more fully appear.

In the accompanying drawings, I have shown for purposes of illustration, one embodiment which my invention may assume in practice.

In these drawings:—

Figure 1 is a side elevation of a standard form of lathe equipped with my improvement;

Figure 2 is a partial longitudinal sectional view of my improved chuck structure removed from the lathe and with the intermediate spindles broken away to facilitate illustration;

Figure 3 is an end view of the chuck with certain parts broken away on line 3—3 of Figure 2 to facilitate illustration;

Figure 4 is a partial section on line 4—4 of Figure 2 with certain overlying parts only partially broken away to facilitate illustration;

Figure 5 is a detail view of the rotatable jaw actuating member of the chuck;

Figure 6 is a side view of the same;

Figure 7 is a detail view of the chuck end of the spindle;

Figure 8 is a detail view of the jaw guide;

Figure 9 is a detail view of one of the operating pins;

Figure 10 is a similar view of the same but at right angles to that shown in Figure 9, and Figure 11 is also a top plan view of one of the pins.

In this illustrative construction, I have shown a lathe, generally indicated at 1, and carrying a tool head 2 adapted to operate on work held in the jaws 3 of a chuck 4, while the stock is fed through a spindle 5 suitably journaled intermediate its ends and at its outer end on the lathe and the chuck jaws are actuated by electrically operated mechanism disposed in a casing 6 and supplied with current through conductor connections 7.

While the connections of the electric actuating means may obviously assume different forms, it will be noted that in the preferred construction illustrated, the conductors 7 are herein connected in a usual way by brushes 8 to rings 9, herein disposed in a suitable casing 9a at the outer end of the casing 6. Further, it will be noted that these rings are so supported as to permit the passage of bar stock into and through the spindle 5. As shown, a sleeve 10 extending axially of the parts provides a suitable stock passage and is carried in a like projection 10a on a magnet frame 11. Herein, the latter also carries therein a series of oppositely acting magnet coils 12, 13, hereinafter described, which are in turn supplied through the brushes 8, rings 9 and usual leads 14 and act to energize pole faces 15 or 16. These, in turn, reciprocate an armature member 17 which is movable with an inner sleeve member 18 concentric with and reciprocable relative to the member 10 and the stock which also passes through the member 18. Thus it will be evident that with the use of usual controlling mechanism controlling the energization of the coils 12 and 13, the member 17 may be moved reversely to effect opposite longitudinal movements of the member 18 relative to the stock passing therethrough.

More particularly considering the operating magnet structure, it will be noted that the outer spindle 5, which is as usual supported on the lathe frame at spaced points along its length, herein is connected by a threaded ring member 25 and screws 26 to one of two complementary generally cylindrical hollow frame members 27, 28 comprised in the magnet frame 11 heretofore mentioned. Moreover it will be noted that the two frame members 27, 28 which abut a transverse central line 29 are also connected to one another by an outer series of longitudinally disposed radially located screws 30 and an inner series of similar screws 31. It will also be noted that the two sections 27 and 28 are clamped together with the two sets of magnetic coils 12 and 13 disposed between the different sets of screws 30 and 31 and the movable armature 17 reciprocable between the pole faces 15 and 16 relative to and along the screws 31. More particularly, it will be noted that the members 27 and 28 are each chambered as at 32 to receive the magnet structures, the cores of which are connected thereto in any suitable manner as by screws 33. Attention is here also directed to the fact that the exposed portions of the screws 31 are housed in suitable non-magnetic bushings 34 extending through the pole faces 15 and 16 and the armature 17. It will also be noted that the latter is connected as by threading at 35 at a point substantially midway between the ends of the sleeve 18 and that the latter is also of non-magnetic material and herein also spaced from the frame members 27 and 28 and the pole faces by bronze bushings 36. It will also be noted that the member 18 at one limit of its travel abuts against the adjacent end of the sleeve 10, while at its opposite end it is provided with a flange 37 threaded to an inner reciprocable actuating spindle or drawbar 38, also hollow to permit passage of the stock therethrough, and having a portion larger than the latter spindle and adapted to engage an abutment 39 on the outer spindle 5 at one end of its travel, and an abutment 40 on the member 27 at the opposite end of its travel.

Thus it will be evident that depending upon the energization of the coils 12, 13, the member 17 will be moved reversely and cause the member 18 to move to the left or the right in Figure 2 in such manner as to cause the actuating spindle 38 to move either to the left or to the right. Further, it will be evident that the stock will be enabled to remain in and be passed through the passage formed by the members 10, 18 and 38. It will also, of course, be evident that the members 18 and 38 will be freely reciprocable relative to the bar stock so that the armature 17 may be moved at any time to effect control of the chuck as hereinafter described.

Operatively connected to and actuated by the reversely reciprocable actuating spindle 38 is improved chuck actuating mechanism. Herein, it will be observed that the spindle 5 is provided with a flange portion 50 on its end adjacent the chuck, and that this portion has attached to it as by screws 51, 51a, 51b co-operating head members 52 and 53 co-operating to present between the same a chamber 54a for a rotatable member 54 which in turn actuates the chuck jaws 3, as hereinafter described. Moreover, it will be noted that the member 38 has threaded to its adjacent end a sleeve member 55 of slightly larger external diameter than the member 38 but of the same internal diameter as the latter and likewise adapted to permit the passage of stock therethrough, while herein also provided with an end socket 56. As shown, this member 55 is provided with any suitable series of angularly disposed slots 57, herein three, disposed at any suitable angle relative to the longitudinal axis thereof which is adapted to require the desired minimum of power to transform a longitudinal movement of the member 38 into a rotary movement of the pins extending into these slots. Herein the angle is 45 degrees, though obviously a greater or less angle may be used if desired under certain circumstances. Herein it will also be noted that the member 54 is provided with a hub portion 58 fitting the exterior of the member 55 and having apertures 58a carrying pins 59 extending into the slots 57. More particularly, it will be noted that these pins 59 have cut away portions 60 disposed on opposite sides of the same adapted to engage the opposite walls of the slots 57 and square cut lower ends 61, all in such manner as to give a maximum of metal and strength while enabling the pin to conform to the slot 57. Thus it will be evident that when the member 38 is moved back and forth, the member 54 will be caused to rotate by reason of the engagement of the pins 59, while being moved positively in either direction.

The chuck jaws are operatively connected to and actuated by this rotatable jaw actuating member 54. More particularly considering the latter, it will be noted that it is herein provided with a series of apertures 65 adapted to permit the same to move relative to the screws 51 and 51b while the same is further provided with a peripheral portion 66 and a series of arcuate laterally projecting actuating portions 67 (Figure 5) disposed near its periphery between each adjacent pair of apertures 65. As shown, the member 52 is also provided with internal projections 68 and 69 adapted to locate the member 54 for rotation relative to the same, and engageable with the opposite face of the member 54 from that carrying the portion 67. Herein also, it will be noted that the jaws 3 are suitably connected as by screws 71 to jaw carrying members 72 which in turn have disc-like apertures 73 in their opposite faces receiving discs 74 which in turn are provided with arcuate slots 75 receiving and traveling along relative to the arcuate projecting portions 67 heretofore described. It will also be noted that a member 76, forming an extension of the member 38 and likewise axially apertured to permit the stock to pass therethrough, is seated in the aperture 56 in the member 55, and that this member is provided with apertures 77 permitting the inward and outward movement of the members 72, while the member 76 is suitably connected as at 78 to the member 53. Thus it will be evident that as the member 54 is rotated reversely, the movement of the portions 67 thereon relative to the member 74 will cause the jaws 3 to move in and out relative to the work in a well known manner.

As regards the operation of the construction considered as a whole, it will be evident that the armature 17 may be reversely operated by the magnets to effect opposite longitudinal movements of the member 38 which will, in turn, through the slot 57 in the member 55, effect opposite rotative movements of the member 54. This will, in turn, effect corresponding movement of the jaws 3 into or out of gripping position. Thus it will be evident that a construction is produced in which the jaws are not only adapted to be closed by power, but also be opened by power with facility and certainty in such manner as to eliminate any difficulty due to sticking to the work. The construction is also adapted to work requiring either power operated expanding or power operated contracting jaws, equal power for gripping being available in either direction of jaw movement. Here, of course, it will be understood that when it is desired to use the same on work requiring expanding jaws, well known jaws of that type will be substituted for the jaws 3 shown herein. It will also be evident that by reason of the connections provided, the jaws will tend to be held securely in their positions of adjustment while at the same time being readily released upon a reverse movement of the armature and a consequent reverse movement of the mechanical actuating means for the jaws.

As a result of my improved construction, at the same time that it is made possible to use an electrically actuated chuck, and one of the reversible type adapted to actuate the jaws by power to expand or contract for different classes of work, it is also made possible to avoid the necessity for providing the motor and gear box connections heretofore used, and also to provide a mechanism adapted to use with bar stock, and heretofore incapable of use with the motor and gear constructions mentioned. Attention is further directed to the fact that as a result of the improved location of the motor means outside or remote from the chuck, as distinguished from being built into the chuck, it is made possible not only to reduce the cost materially without affecting the accuracy of the chuck, but also to dispose the motor more conveniently and safely, particularly in an electrically operated mechanism, while also effectually protecting the motor windings from chips or lubricating fluid, more readily magnetically shielding the chuck from the motor means, facilitating changing of the chuck when desired, and also more readily and inexpensively obtaining the desired rigidity of the structure and producing a more symmetrical distribution of the stress and weight in the rotatable element of the machine, at the same time that difficulty due to vibration of the spindle is minimized. It will also be noted that the electro-magnetic mechanism is so arranged as to be exceedingly compact, and is also such as to enable an exceedingly strong mechanism to be provided in a relatively small space while utilizing electro-magnetic structures of standard form. Attention is also directed to the fact that my improved connection between the electromagnetic mechanism and the chuck makes it possible to simplify the connections, while my improved structure of the chuck is not only such as to enable the same to be made economically, but also such as to hold the jaws from slipping back and thus enable a substantial saving in power as compared with those constructions wherein the power has to be on all the time that the jaws engage the work. These and other advantages of my improved construction will, however, be apparent to those skilled in the art.

While I have in this application specifically described one embodiment which my invention may assume in practice, it will be understood that the same is shown for purposes of illustration and that the invention may be modified and embodied in various other forms without departing from its spirit or the scope of the appended claims.

What I claim as new and desire to secure by Letters Patent is:—

1. In combination, a rotatable hollow spindle having a journal bearing, a chuck carried by said spindle at one end thereof and rotatable therewith having a casing and jaws movable relative thereto to engage and disengage work fed through said hollow spindle, motor means at the opposite side of said bearing from said truck having a stock passage through said motor means which is coaxial with the spindle axis, and jaw adjusting mechanism having means operated by said motor means and selectively operable in different directions for gripping and releasing the work.

2. In combination, a rotatable hollow spindle having a journal bearing, a chuck carried by said spindle at one end thereof and rotatable therewith having jaws movable to engage and disengage work fed through said hollow spindle, mechanism for adjusting said chuck jaws, electric motor means spaced longitudinally of said spindle from said chuck and on the opposite side of said bearing from said chuck and coaxial with said spindle having a passage aligned with the passage through said spindle permitting stock to be fed therethrough to said jaws, and means operatively connecting said motor means and jaw adjusting mechanism and disposed out of the path of stock to be fed to said chuck jaws.

3. In combination, a rotatable hollow spindle, a chuck carried by said spindle at one end thereof and rotatable therewith having jaws movable to engage and disengage work fed through said hollow spindle, motor means having a stock passage therethrough which is coaxial with the spindle axis, and jaw adjusting mechanism having operating means inside said spindle and operated by said motor means and selectively operable by the latter in different directions for gripping and releasing the work.

4. In combination, a rotatable hollow spindle having a journal bearing, a chuck carried by said spindle at one end thereof and rotatable therewith including jaw adjusting mechanism having jaws movable to engage and disengage work fed through said hollow spindle, a plurality of motor means on the opposite side of said bearing from said chuck having a stock passage therethrough which is coaxial with the spindle axis, and operating means for said jaw adjusting mechanism disposed coaxial with said spindle and permitting bar stock to be fed through said operating means to said chuck jaws and selectively positively operable by said motor means in different directions for gripping and releasing the work.

5. In combination, a rotatable hollow spindle, a chuck carried by said spindle at one end thereof and rotatable therewith including jaw adjusting mechanism having jaws movable to engage and disengage work fed through said hollow spindle, motor means having a stock passage therethrough which is coaxial with the spindle axis, and operating means for said jaw adjusting mechanism disposed coaxial with said spindle and within the same permitting bar stock to be fed through said operating means to said chuck jaws and selectively positively operable by said motor means in different directions for gripping and releasing the work.

6. In combination, a rotatable hollow spindle having a journal bearing, a chuck carried by said spindle at one end thereof and rotatable therewith having jaws movable to engage and disengage work fed through said hollow spindle, a plurality of motor means on the opposite side of said bearing from said chuck, and jaw adjusting mechanism selectively operative in opposite directions by different motor means to actuate said jaws reversely.

7. In combination, a rotatable hollow spindle having a journal bearing, a chuck carried by said spindle at one end thereof and rotatable therewith having jaws movable to engage and disengage work fed through said hollow spindle, a plurality of electric motor means spaced longitudinally of said spindle and on the opposite side of said bearing from said chuck and coaxial with said spindle having a passage permitting stock to be fed therethrough to said jaws, and jaw adjusting mechanism having common means coaxial with said spindle and selectively operative by different motor means to actuate said jaws reversely and having a stock passage therethrough aligned with the passage through said spindle and motor means.

8. In combination, a rotatable hollow spindle, a chuck carried by said spindle at one end thereof and rotatable therewith having jaws movable to engage and disengage work fed through said hollow spindle, and mechanism for adjusting said jaws including motor means having a stock passage therethrough which is coaxial with said spindle and mechanism operated by said motor means and actuating said jaws having means reversely reciprocable by said motor means parallel to said spindle axis to adjust said jaws reversely relative to the work.

9. In combination, a rotatable hollow spindle, a chuck carried by said spindle at one end thereof and rotatable therewith having jaws movable to engage and disengage work fed through said hollow spindle, mechanism for adjusting said chuck jaws, motor means coaxial with said spindle having a passage permitting stock to be fed therethrough, and mechanism for operatively connecting said motor means and jaw adjusting mechanism including means reciprocable reversely by said motor means and also having a stock passage therethrough aligned with the passage through said spindle and motor means.

10. In combination, a chuck having jaws carried by a hollow rotatable spindle fixed against longitudinal movement, a second hollow spindle coaxially disposed within said first spindle and longitudinally reciprocable, electro-responsive means disposed coaxially with both of said spindles for reciprocating said inner spindle and having a central longitudinally extended stock aperture therethrough, and actuating means between said jaws and said inner spindle.

11. In combination, a chuck having jaws carried by a hollow rotatable spindle fixed against longitudinal movement, a second hollow spindle coaxially disposed within said first spindle and longitudinally reciprocable, electro-responsive means disposed coaxially with both of said spindles including an armature longitudinally reciprocable with said inner spindle, and having a central longitudinal stock aperture extended therethrough and actuating means between said jaws and said inner spindle.

12. In a machine tool, the combination of a frame, a rotatable hollow spindle having a support intermediate its ends on said frame, a chuck carried by said spindle at one end thereof having radially adjustable jaws movable into and out of engagement with work fed through said spindle, a coaxially disposed hollow drawbar extended through said spindle having an operative connection at one end with said chuck jaws, and coaxially disposed electro-responsive means carried by said spindle at its other end having an axial stock passage therethrough in alignment with the axial passage through said drawbar and having a driving member for said drawbar disposed coaxially therewith.

13. In a machine tool, the combination of a horizontal frame having an upstanding spindle supporting portion, a rotatable hollow spindle journaled intermediate its ends thereon and extending laterally therebeyond in both directions, a chuck carried by one extended end of said spindle having radially adjustable jaws movable into and out of engagement with work fed through the passage in said spindle, a coaxially disposed drawbar extended through said spindle having an axial passage therethrough and having an operative connection at one end with said chuck jaws, and coaxially disposed electro-responsive means carried by the other extended end of said spindle having a stock aperture therethrough in axial alignment with the axial passage through said drawbar and having a driving connection with the latter likewise coaxially disposed, said spindle having a second support on said frame adjacent the extended end thereof which is remote from said chuck.

14. In combination, a chuck having jaws, coaxial spindles providing an outer rotatable jaw carrying member and a jaw operating member longitudinally reciprocable inside said first member, and electro-responsive means for operating said inner reciprocable member including a longitudinally reciprocable actuating member carried by the latter and disposed coaxially with both of said spindles.

15. In combination, a chuck having jaws, coaxial spindles providing a rotatable jaw carrying member and a reciprocable jaw operating member, and electro-responsive means for operating said reciprocable member disposed coaxially therewith and having an axial aperture therethrough, said reciprocable member being disposed within said jaw carrying member and having a stock aperture extending longitudinally therethrough in alignment with the aperture of said electro-responsive operating means.

16. In combination, a chuck having jaws, concentrically disposed hollow spindles providing an outer jaw carrying member and an inner reciprocable jaw operating member through which work is adapted to be fed to said chuck jaws, electro-responsive means for operating said inner reciprocable spindle including a coaxially disposed actuating member having a driving connection with the latter disposed coaxially therewith and having an axial aperture therethrough, and electric supply connections for said electric operating means likewise disposed coaxially with said reciprocable spindle.

17. In a chuck, the combination of an outer rotatable casing having an axial passage therethrough and carrying jaws at one end thereof, electric motor means fixedly attached to said casing at the other end thereof, electric supply connections for the latter, operating mechanism for said jaws, a drawbar operated by said motor means and extending axially therethrough and through the axial passage in said casing to said jaws and having an operative connection with said jaw operating mechanism, and co-operating stock aperture means in said drawbar and said supply connections permitting the passage of stock to said jaws.

18. In combination, a hollow rotatable spindle, a chuck carried by said spindle at one end thereof having work engaging jaws, a longitudinally reciprocable jaw operating member within said spindle having an operative connection at one end thereof with said chuck jaws, and electro-responsive means at the other end of said spindle including a longitudinally reciprocable actuating member carried by the opposite end of said jaw operating member.

19. In a chuck, the combination with movable jaws carried by a member adapted for rotary movement only, of mechanism for reversely adjusting said jaws having a drawbar reciprocable inside said member for actuating said mechanism, electric motor means coaxial with said drawbar having connections for reciprocating said drawbar by the power of said means in either direction, and stock aperture means extending through said motor means and through said drawbar to said jaws.

20. In a chuck, the combination with non-resilient movable jaw means, of mechanism for adjusting said jaw means having a reciprocable drawbar actuating said mechanism, electric motor means disposed coaxially of said drawbar having connections for reciprocating said drawbar by the power of said means in either direction, and means forming a stock aperture extending through said motor means and drawbar to said jaw means.

21. In a chuck, the combination with non-resilient movable jaw means, of mechanism for adjusting said jaw means having a hollow reciprocable drawbar actuating said mechanism, and a plurality of electric motor means spaced longitudinally from one another relative to said drawbar and through which stock is feedable and having connections for positively reciprocating said drawbar reversely by power.

22. In a chuck, the combination with movable jaws, of mechanism for adjusting said jaws having a reciprocable drawbar actuating said mechanism, and a plurality of externally located electric magnets spaced longitudinally from one another on said drawbar for reciprocating the same reversely and having armature means connected to said drawbar and disposed between said magnets.

23. In a chuck, the combination with movable jaws, of mechanism for adjusting said jaws having a reciprocable drawbar actuating said mechanism, and a plurality of externally located electric magnets spaced longitudinally from one another on said drawbar for reciprocating the same reversely and having armature means connected to said drawbar and disposed between said magnets comprising a common armature member movable reversely when different magnets are energized.

24. In a chuck, the combination with reciprocable power operated means having an axial stock aperture therethrough, a chuck having a corresponding stock aperture and jaws movable relative thereto, of means for converting reverse reciprocable movements of said power operating means into reverse movements of said jaws comprising a reciprocable member, a rotary member on said chuck, cam means between said reciprocable and rotary members for effecting rotation of the latter, and cam means between said rotary member and said jaws for effecting movements of the latter.

25. In combination, a hollow reciprocable spindle having a stock aperture therethrough, electrical motor means disposed coaxially of the spindle for positively reciprocating the same reversely, also having a stock aperture therethrough in alignment with the aperture in said spindle, a chuck having jaws movable toward and from the stock extending through said spindle, and means between said jaws and said reciprocable spindle and operated by said motor for moving said jaws toward and from the work as said spindle is oppositely reciprocated.

26. An electric operating mechanism for chucks comprising an outer spindle, jaws carried thereby, an inner spindle reciprocable within said outer spindle and having an axial stock aperture therethrough, electric motor means carried by said outer spindle disposed coaxially with the same and having an axial stock aperture therethrough in alignment with the aperture in said inner spindle, and operative connections to said motor means for positively reciprocating said inner spindle.

27. An electric operating mechanism for chucks comprising an outer spindle, an inner spindle reciprocable therein and having an axial stock aperture therethrough, electric motor means carried by said outer spindle coaxially with the same having an axial stock aperture therethrough in alignment with the aperture in said inner spindle, operative connections to said motor means for positively reciprocating said inner spindle, and supply connections for said motor means comprising rings connected thereto and carried by said outer spindle around the stock inlet, and brushes co-operating with said rings.

28. A power operating mechanism for chucks comprising a hollow operating spindle adapted to receive bar stock, an armature member located externally of said spindle and within the longitudinal limits thereof and oppositely disposed electromagnetic means for effecting positive opposite reciprocations of said armature member and spindle, and a rotary casing enclosing said armature member and carrying said electromagnetic means while permitting free reciprocation of said armature and spindle.

29. A power operating mechanism for chucks comprising a hollow operating spindle adapted to receive bar stock, an armature member located externally of said spindle and within the longitudinal limits thereof and oppositely disposed electromagnetic means for effecting positive opposite reciprocations of said armature member and spindle, a rotary casing enclosing said armature member and carrying said electromagnetic means while permitting free reciprocation of said armature and spindle, said casing having a non-reciprocable portion coaxial with said first mentioned spindle, and electric terminal connections for the electromagnetic means carried by said portion.

30. In a chuck, a chuck casing, a spindle having a stock aperture therethrough and reciprocable axially of said casing, a rotary jaw actuating member in said casing, means for converting reciprocation of said spindle into a rotary movement of said member, jaws on said casing engageable with stock fed through said spindle, and co-operating means for effecting jaw movement upon rotation of said member.

31. In a chuck, a chuck casing, a spindle reciprocable axially thereof, a rotary jaw actuating member in said casing, pin and slot means for converting reciprocation of said spindle into a rotary movement of said member, jaws on said casing, and co-operating means for effecting jaw movement upon rotation of said member comprising arcuate cam members on said rotary member, co-operating members movable with said jaws and engaging said cam members, and co-operating guide means for said jaws.

32. A chuck structure comprising a head having an axial stock aperture therein, jaw carrying members in said head movable toward and from the work without obstructing said aperture, discs carried in said members and having arcuate slots therein, and a rotary actuating member having arcuate actuating portions movable reversely in said arcuate slots to effect reverse movements of said jaw carrying members.

33. In a chuck, a head having an axial operating member therefor provided with a series of angularly disposed slots, a coaxially mounted actuating member carrying pins disposed in said slots and also having a series of arcuate members adjacent its periphery, jaw carrying members movable on said head, and discs seated in said members and having arcuate slots in which said arcuate members are reversely movable.

34. In a chuck, an inner hollow reciprocable spindle, an external armature member movable therewith, an outer rotary spindle, co-operating sets of magnets carried thereon for oppositely moving said armature member and inner spindle, a rotatable jaw controlling member, connections between said controlling member and said inner spindle for converting longitudinal movement of the latter into a rotary movement of said controlling member, a plurality of jaws rotatable with said outer spindle, and means for converting rotary movements of said controlling member into reciprocatory movements of said jaws.

35. In a chuck, an inner hollow reciprocable spindle, an external armature member movable therewith, an outer rotary spindle, co-operating sets of magnets carried thereon for oppositely moving said armature member and inner spindle, a rotatable jaw controlling member having a series of arcuate jaw actuating portions thereon, connections between said inner spindle and said controlling member, a plurality of jaw carrying members rotatable with said outer spindle, and discs seated in said members and having arcuate slots engaging said arcuate portions.

36. In a chuck, an inner hollow reciprocable spindle, an external armature member movable therewith, an outer rotary spindle, co-operating sets of magnets carried thereon for oppositely moving said armature member and inner spindle, a rotatable jaw controlling member having a series of arcuate jaw actuating portions thereon, slot and pin connections between said inner spindle and said controlling member, a plurality of jaw carrying members rotatable with said outer spindle, discs seated in said members and having arcuate slots engaging said arcuate portions, and a member coaxial with said inner spindle and rotatable with the outer spindle having jaw apertures therein and an axial stock aperture.

JOHN BATTALINE.

CERTIFICATE OF CORRECTION.

Patent No. 1,986,494. January 1, 1935.

JOHN BATTALINE.

It is hereby certified that error appears in the printed specification of the above numbered patent requiring correction as follows: Page 3, first column, line 64, claim 1, for "truck" read chuck; page 5, second column, lines 17 and 28, claims 28 and 29 respectively, after "and" insert the words and comma, movable with said spindle,; and that the said Letters Patent should be read with these corrections therein that the same may conform to the record of the case in the Patent Office.

Signed and sealed this 5th day of March, A. D. 1935.

(Seal)

Leslie Frazer
Acting Commissioner of Patents.